UNITED STATES PATENT OFFICE.

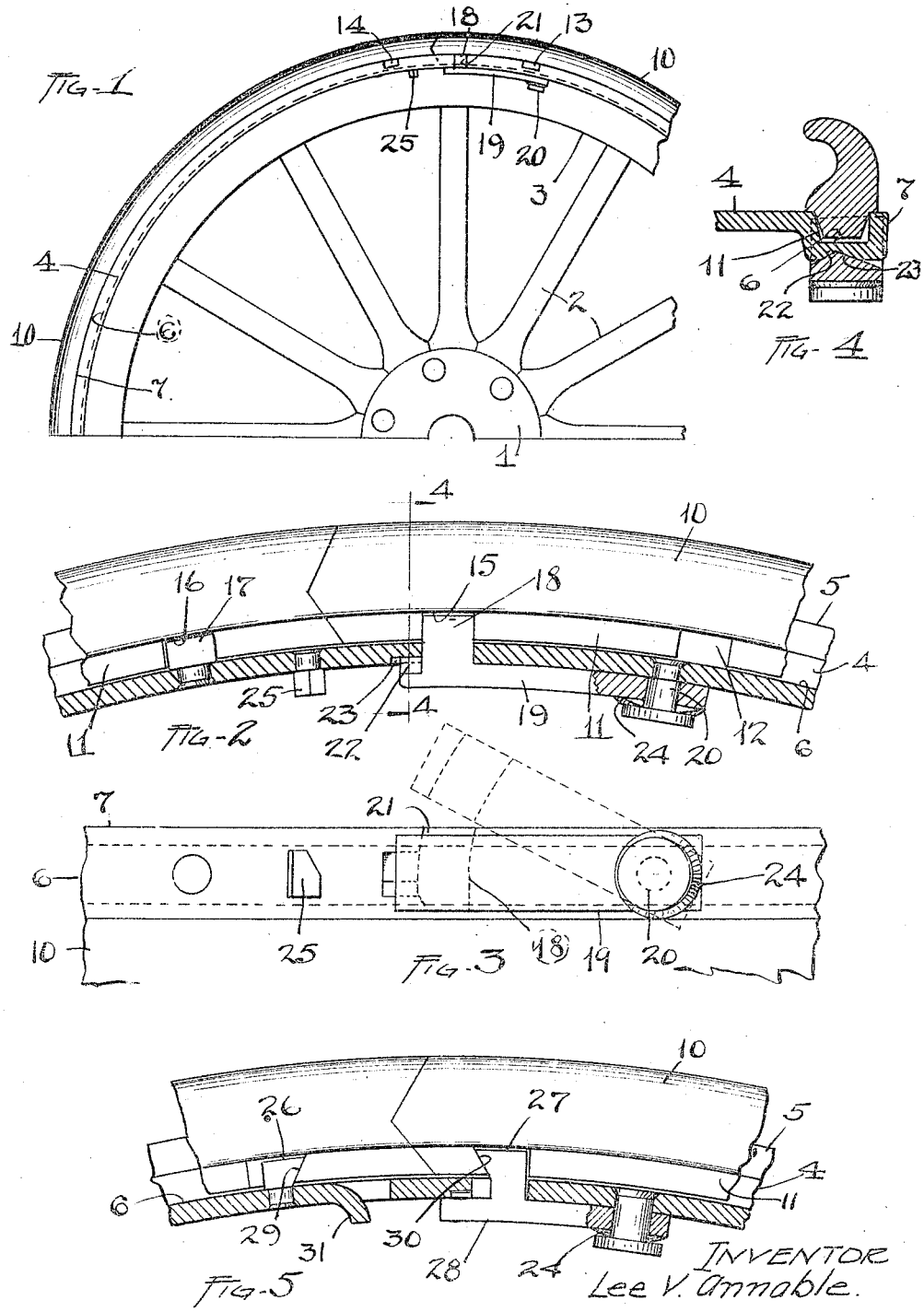

LEE V. ANNABLE, OF CLEVELAND, OHIO, ASSIGNOR TO THE STANDARD PARTS COMPANY, OF CLEVELAND, OHIO, A CORPORATION OF OHIO.

VEHICLE-WHEEL RIM.

1,309,751.  Specification of Letters Patent.  Patented July 15, 1919.

Application filed August 30, 1917. Serial No. 187,046.

*To all whom it may concern:*

Be it known that I, LEE V. ANNABLE, a citizen of the United States, and a resident of Cleveland, county of Cuyahoga, and State of Ohio, have invented a new and useful Improvement in Vehicle-Wheel Rims, of which the following is a specification, the principle of the invention being herein explained and the best mode in which I have contemplated applying that principle, so as to distinguish it from other inventions.

The present improvements have as their object the simplification of so-called "Q. D." or quick detachable rims for pneumatic tires, such as are largely used in connection with automobiles and the like. It will be understood, of course, that the trade designation "Q. D." does not refer to the rim proper, but rather to a side flange on such rim, which is rendered detachable in order to facilitate the placing of a tire on, or its removal from the rim. The present improvements relate more especially to that type of detachable side flange, or ring, which is transversely split in order to permit it to be taken off and put on a rim, and to the locking device to secure the ends thereof in place when it is in operative position.

To the accomplishment of the foregoing and related ends, said invention, then, consists of the means hereinafter fully described and particularly pointed out in the claims. The annexed drawing and the following description set forth in detail certain mechanism embodying the invention, such disclosed means constituting, however, but one of various mechanical forms in which the principle of the invention may be used.

In said annexed drawing:—

Figure 1 is a side elevational view of a portion of a wheel showing a quick detachable rim thereon embodying my present improved construction of locking device; Fig. 2 is a side elevational view of the meeting ends of the split-side flange, or ring, with the locking device shown in operative position, the adjacent portion of the rim appearing in section; Fig. 3 is a bottom plan view of the same parts as appear in Fig. 2; Fig. 4 is a transverse section of the locking device and adjacent portion of the rim taken on the plane indicated by the line 4—4, Fig. 2; and Fig. 5 is a view similar to Fig. 2, but showing a modification in the construction of the locking device.

The construction of the wheel body, which is illustrated in part only in the aforesaid drawing, is a matter of indifference so far as the present invention is concerned, consisting, as shown, of the usual hub 1, spokes 2, and felly 3. The rim 4, which surrounds such felly, is preferably of the so-called "universal" type; that is it is provided with an abutment 5 around its rear edge (see Fig. 2) adapted to retain in place a continuous side flange, or ring, (not shown), which may be reversed to receive and hold either a straight-side or clencher tire. On the other hand such rim may of course be provided with an integral side flange on such rear edge, of either the straight-side or clencher type.

The front edge of the rim 4 is provided with an encircling groove or recess 6, conveniently formed by beading such edge, the outer wall 7 of the groove lying flush, or slightly below, the outer surface of the rim, so as to permit the aforesaid reversible side-flange (when one is used) to be slipped over it, as occasion may require.

The part of the structure of present interest is the outer flange 10, which, as previously indicated, is transversely split at one point in its circumference in order that it may be detachably secured to the rim, such flange having its inner edge 11 formed to seat in the aforesaid groove or depression 6, but being sufficiently resilient to permit its ends to be separated and the ring thus expanded until it can be removed from such groove. The one end (the right as shown in Fig. 1) is formed to overlie the other either in part or whole. This result is secured in the illustrated construction by forming such right-hand end of convex V-shape, and the opposed end of concave V-shape. The right-hand end has its edge 11 cut away at a point 12 removed a short distance from the split, as shown in Fig. 2, so as to permit a screwdriver or like implement to be inserted in order to assist in prying the flange or ring out of the groove, the outer wall 7 of the groove being cut away at corresponding points 13 and 14 at either side of the split in the flange, as shown in Fig. 1, for the same purpose.

The inner edge 11 of the flange or ring is also cut away to form notches 15 and 16 at points equidistantly removed from the split, the form of these notches being clearly shown in Fig. 2, where is also shown a fixed lug or abutment 17 projecting upwardly from the bottom of the groove or depression 6, in order to engage the notch in the left-hand end of the flange, as there illustrated; while the notch in the opposite end is designed to be engaged by means of a removable lug or abutment 18 on a pivotal latch 19 secured to the under side of the bead by means of a rivet 20. The side wall 7, as well as the bottom of the groove 6, is cut away at the proper place to form a recess 21, through which the projection 18 on the latch 19 may be swung into engagement with the particular notch (15 or 16) in the flange that happens to be in register therewith.

There is also formed a hump 22 on the back of the latch at its forward end, which is adapted to engage a recess 23 in the under side of the bead, when the latch is in its operative or locking position. The resiliency of the latch itself may be depended upon to permit of the necessary flexing involved, although I preferably employ a spring washer 24 between the head of the rivet and the corresponding end of the latch, this washer permitting a certain amount of give, as the latch is swung into place. There is also provided a stud, shown as the projecting head of a rivet 25 in the bead adjacent the free end of the latch 19, against which a screwdriver, or like implement, may rest as a fulcrum, when it is desired to force the latch outwardly, and thus free the flange end.

In the construction illustrated in Fig. 5, the modifications principally consist in the form of the permanent lug 26 in the bottom of the groove, and the lug 27 carried by the pivotal latch 28. Both of these lugs are formed with corresponding undercut faces preferably inclined or beveled, as shown, and the complementary notches 29 and 30, in the inner edge 11 of the flange 10 are cut, or inclined, to correspond. There will accordingly be a still more absolute locking effect secured with this form of device. There is also shown in this same connection a rest or fulcrum 31 consisting simply of a down-turned section of the bottom of the groove, instead of a rivet-head, as in the first described construction.

The mode of operation of the device should be apparent, being the same in the case of both constructions. The one end of the split flange 10, the particular end selected depending upon whether the flange is to be turned with its concave face inwardly or outwardly, is placed with the corresponding notch in its inner edge 11 over the fixed lug or abutment 17 (or 26) in the bottom of the groove 6. The body of the flange is then sprung into place, this bringing the other or free end into juxtaposition with the end thus first located. By exerting a slight pressure upon this second end, it is brought into close contact with the first end, and the latch 19 (or 28) is swung into place. With the latch in place, the flange end which it engages is held against retraction, and owing to the form of the meeting ends of the flange at the split, the latter cannot become separated without one end or the other being slightly withdrawn in a circumferential direction. The means described, accordingly, serve to effectively hold the flange to the rim, and at the same time constitute a simple and inexpensive device to manufacture, and one that it is practically impossible to get out of order.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination with a wheel rim having an encircling groove or depression near one edge; of a split side-flange adapted to removably seat in such groove; and two abutments, one fixed and the other removable, located in said groove and adapted to engage the respective ends of said flange.

2. The combination with a wheel rim having an encircling groove or depression near one edge; of a split side-flange adapted to removably seat in such groove, one end of said flange being formed to overlie the other; and two abutments, one fixed and the other removable, located in said groove and respectively adapted to engage the under and overlying ends of said flange.

3. The combination with a wheel rim having an encircling groove or depression near one edge; of a split side-flange adapted to removably seat in such groove, the ends of said flange being of complementary concave and convex form; and two abutments, one fixed and the other removable, located in said groove and respectively adapted to engage the concave and convex ends of said flange.

4. The combination with a wheel rim having an encircling groove or depression near one edge; of a split side-flange adapted to removably seat in such groove, one end of said flange being adapted to interlock directly with said groove so as to be held against circumferential movement and registering notches being formed in the other flange-end and the wall of such groove; and a member movably attached to said rim and adapted in one position to fit in such notches, thereby locking second flange-end in place.

5. The combination with a wheel rim having an encircling groove or depression near one edge; of a split side-flange adapted to removably seat in such groove, one end of said flange being adapted to interlock directly with said groove so as to be held against circumferential movement and registering notches being formed in the other flange-end and the wall of such groove; and a member pivotally attached to said rim and adapted in one position to fit in such notches, thereby locking second flange-end in place.

6. The combination with a wheel rim having an encircling groove or depression near one edge; of a split side-flange adapted to removably seat in such groove, a notch being formed in the inner edge of each flange-end equidistantly from the split therein; a permanent lug in such groove adapted to interlock with either such notch to hold the corresponding flange-end in place, the wall of such groove being formed with a notch adapted in such position of the flange to register with the notch in the other end thereof; and a latch pivotally attached at one end to the under side of said rim and having a projection adapted in one position of said latch to fit in such registering notches, thereby locking said second flange-end in place.

Signed by me, this 15 day of August, 1917.

LEE V. ANNABLE.